United States Patent [19]

Rasmussen

[11] Patent Number: 4,518,638
[45] Date of Patent: May 21, 1985

[54] METHOD FOR THE PROTECTION OF SHIPS AND OTHER OBJECTS AGAINST FOULING

[76] Inventor: Oystein Rasmussen, Hosleveien 119, NO-1340 Beekestua, Norway

[21] Appl. No.: 572,527

[22] Filed: Jan. 20, 1984

[30] Foreign Application Priority Data

Jan. 31, 1983 [NO] Norway ............................... 830306

[51] Int. Cl.³ .............................................. B05D 3/02
[52] U.S. Cl. .............................. 427/407.1; 427/385.5; 427/388.2; 427/409
[58] Field of Search .................. 106/15.05; 427/388.1, 427/388.2, 407.1, 409, 385.5; 114/361, 67 R, 67 A

[56] References Cited

U.S. PATENT DOCUMENTS

| | | | |
|---|---|---|---|
| 3,011,988 | 12/1961 | Luedka et al. | 428/522 |
| 3,575,123 | 4/1971 | Shepherd et al. | 114/67 R |
| 3,786,113 | 1/1974 | Vassileff | 260/836 |
| 3,990,381 | 11/1976 | Shepherd et al. | 427/265 X |
| 4,082,884 | 4/1978 | De Long | 428/262 |
| 4,129,610 | 12/1978 | Kobayashi et al. | 523/402 X |
| 4,312,902 | 1/1982 | Murase et al. | 427/388.2 X |

FOREIGN PATENT DOCUMENTS 1554596 10/1979 United Kingdom .

*Primary Examiner*—Thurman K. Page
*Attorney, Agent, or Firm*—Owen, Wickersham & Erickson

[57] ABSTRACT

In a method for protecting the underwater surface of ships and other marine structures against fouling the underwater surface is treated with a fouling protection composition. Said composition consists of a first part dissolved primarily in non polar solvents and contains the larger amount of antifouling toxins. The second part of the composition is dissolved in water and/or polar solvents and contains hydrophilic polymers. The two parts are mixed together immediately prior to use and then applied in one operation on the underwater surface to be protected.

5 Claims, No Drawings

METHOD FOR THE PROTECTION OF SHIPS AND OTHER OBJECTS AGAINST FOULING

The invention relates to a method for the protection of ships and other objects against fouling.

A large over-capacity in the world merchant fleet has had the result that many types of ships, particularly large tankers and bulkers, have had prolonged inactive periods between sailings. This situation has had the result that it has become increasingly difficult to give ships an effective protection against fouling.

Socalled "selfpolishing" antifoulings, which are based on the use of copolymers of e.g. tributyltin compounds and ethylenically unsaturated carboxylic acids, must normally have an intermittent physical removal of the surface layer from which the organotin moiety has been removed by an ion exchange process with the sea water, in order to give adequate fouling protection. During ordinary normal operations this is accomplished by polishing of the copolymer antifouling as the ship propulsed through the water. When the ship stays inactive for prolonged periods, however, the renewal of the surface layer does sometimes not proceed rapidly enough to effectively prevent fouling.

Socalled "contact leaching" antifoulings, which are normally based on metallic particulate toxins such as cuprous oxide and solid triorganotin compounds in a non-soluble matrix, e.g. chlorinated rubber or vinyl, and which may or may not contain saponifiable co-binders such as colofonium, also display considerably poorer fouling protection during periods with long intermittent inactivity than during normal operation with only relatively short stays in port.

For both of the above described types of antifoulings the increased tendency for fouling during periods which encompass prolonged inactivity is probably caused by the formation of a somewhat thicker socalled primary film on the surface during the inactive periods. This primary film, which primarily consists of bacteria and other unicellular organisms, absorbs a considerable part of the toxins which are released from the antifouling. As a result, barnacles, algae and other macrofouling species have a better chance of colonializing the surface.

It has turned out that strongly hydrophilic and waterabsorbing coatings, applied on top of one of the socalled "contact-leaching antifoulings" have afforded a significant improvement in the protection against fouling even during periods with prolonged inactivity. Such hydrophilic waterabsorbing coating, which do not normally contain antifouling toxins, perform on top of a "contact-leaching antifouling" as a membrane which controls the release of toxins from the antifouling coating beneath it. At the same time there is an accumulation of dissolved toxins in the water absorbed in the hydrophilic layer to such an extent that it may possibly become bacteriostatic.

Such hydrophilic waterabsorbing coatings are known from U.S. Pat. No. 3.575.123, 3.011.988, 3.786.113 and 4.082.884, from GB Pat. No. 1.554.596, French Pat. No. 2.165.881 and Norwegian Pat. No. 133.407.

This type of coating to be applied on top of a "contact-leaching antifouling", can either be dissolved in organic solvents or in water. They are normally based on hydrophilic polymers such as polyacrylates, polyacrylamides, polyvinylpyrolidinone, polyethylene oxide etc. with free hydroxyl, carboxyl and/or amide molecular groups. To these polymers can be added di- or polyfunctional products acting as cross-linking agents. The degree of cross-linking can be regulated in such a way that the coating on one side has sufficient mechanical strength to withstand the wear during propulsion of the ship through water and on the other side absorbs the necessary amount of water to act as a toxin-release control membrane.

Different types of the mentioned hydrophilic coatings have been applied to a relatively large number of vessels. However, despite examples of good results the method of applying such coatings on top of "contact-leaching antifoulings" has not made a significant breakthrough in the field of fouling protection, except for pleasure crafts and similar small boats. This fact can be due to the expenses connected with the application of an extra coat in addition to the normal 2 to 3 coats applied to a ship during docking, but there may also be some practical problems involved. It has e.g. turned out that hydrophilic coatings dissolved in organic solvents, have been the cause of solvent migration into the underlying paint coats with severe cracking or crocodiling as a result. And both solvent-based and water-based hydrophilic coatings have the problem that uneven application will give uneven film thickness which again leads to uneven toxin-release.

The object of the invention is to solve the above problems and to provide a method for protecting the underwater surface of ships and other structures against fouling, which method is simpler and less expensive than the known methods.

This object is achieved in that a fouling protection composition consisting of one part dissolved primarily in non-polar solvents and containing the larger amount of antifouling toxins, and one part dissolved in water and/or polar solvents and containing hydrophilic polymers, is applied in one operation on the surface to be protected. Other features according to the invention are shown in the following description and in the claims.

The present invention thus solves both the above described cost problems and technical problems in a surprising and simple way. Tests conducted have shown that when a "contact-leaching antifouling" and a known water-based hydrophilic coating material are blended under strong stirring so that the water-based hydrophilic material is dispersed in the solvent-based "contact-leaching antifouling" material, and this blend is applied on a ships bottom which has already been coated with a primer coat and/or an antifouling coat, the hydrophilic water-based material will separate out and form a top layer on the solvent-based antifouling material as the drying of the same proceeds. The preferred application method is airless spray. With this method a hydrophilic membrane layer is obtained which has a more uniform film thickness, a better adhesion, which does not cause cracking or crocodiling and which saves the application costs of an additional coat compared with a separately applied hydrophilic membrane coat.

If the part of such a blend of coating materials which is solvent-based, is primarily dissolved in non-polar solvents, which is normally the case for "contact-leaching antifoulings", the other part can be dissolved not only in water, but also in other polar solvents, such as alcohols, or a mixture of water and alcohol for instance.

From Norwegian patent No. 141.939 is known a method for the application of a 2-phase coating material on hydrophilic surfaces as well as a composition for the method. The said method is used for such surfaces as wood and concrete, which are hydrophilic, with the object of with the polar phase to secure good adhesion to the hydrophilic substrate, and with the non-polar phase to obtain a water-repelling surface layer.

The present invention surprisingly attains the opposite result of the method described above. There are reasons to believe that a contributing factor to this result is the fact that the coating material blend of "contact-leaching antifouling" in non-polar solvents and of hydrophilic membrane component in polar solvents and/or water is applied on top of a recently applied primer or antifouling coat which contains residual non-polar solvents which make the surface hydrophobic. The non-polar phase of the blend will therefore have the greatest affinity for the surface and form the inner layer, whereas the polar phase will be displaced towards the top and form the outer layer.

That this result is of absolutely significant importance for the use of the method is easily understood if one contemplates what the results would be of having a hydrophilic inner layer, viz. that the hydrophilic layer would swell when immersed in water and the outer layer would gradually lose adhesion and fall off.

The formulation below represent one example of the type of "contact-leaching antifouling" which can be used as one part and of the type of hydrophilic polymer composition which can be used as the other part to be mixed together for application in accordance with the present invention.

| Part A - "contact-leaching antifouling" | |
| --- | --- |
| Cuprous oxide and tributyltinfluoride | 55% by wt. |
| Chlorinated rubber resin, rosin ester and suspending agents | 13% by wt. |
| Solvents | 32% by wt. |
| Part B - hydrophilic polymer composition | |
| "Carboset 514H" (40% in ammonia water) | 25% by wt. |
| Isopropanol | 25% by wt. |
| "Polymin P" polyethylenimine (50%) | 25% by wt. |
| Water | 25% by wt. |

Part A and Part B are stirred vigorously before application and preferably applied by airless spray. A coupling agent such as ethylene glycol monoethyl or similar may be added to achieve better dispersion.

What I claim is:

1. A method for treating the underwater surface of ships and other structures as a protection against fouling, comprising:

dissolving in non-polar solvents a contact-leaching anti-fouling composition;

dissolving in a polar solvent a composition containing both anionic and cationic hydrophilic polymers;

mixing together the two resulting solutions, so as to disperse the hydrophilic polymers in the non-polar solution, and immediately after making such mixture, applying the mixture on the surface to be protected.

2. The method according to claim 1, in which the applying step includes applying the mixture on top of a recently applied coat of a primer or an anti-fouling paint which still contains a residual amount of non-polar solvents.

3. The method according to claim 2, in which said applying step is followed by drying the mixture, said hydrophilic polymers then separating out from the mixture and forming a layer on top of said anti-fouling composition.

4. A method for treating the underwater surface of ships and other structures as a protection against fouling, comprising:

mixing together a solution in non-polar solvents of a contact-leaching anti-fouling composition and a solution in a polar solvent of a composition containing both anionic and cationic hydrophilic polymers so as to disperse the hydrophilic polymers in the non-polar solution, and immediately after making such mixture, applying the mixture on the surface to be protected.

5. The method according to claim 4, in which the applying step includes applying the mixture on top of a recently applied coat of a primer or an anti-fouling paint which still contains a residual amount of non-polar solvents.

* * * * *